(No Model.)
M. J. HERBERT.
BALL BEARING FOR VEHICLE WHEELS.
No. 537,152. Patented Apr. 9, 1895.
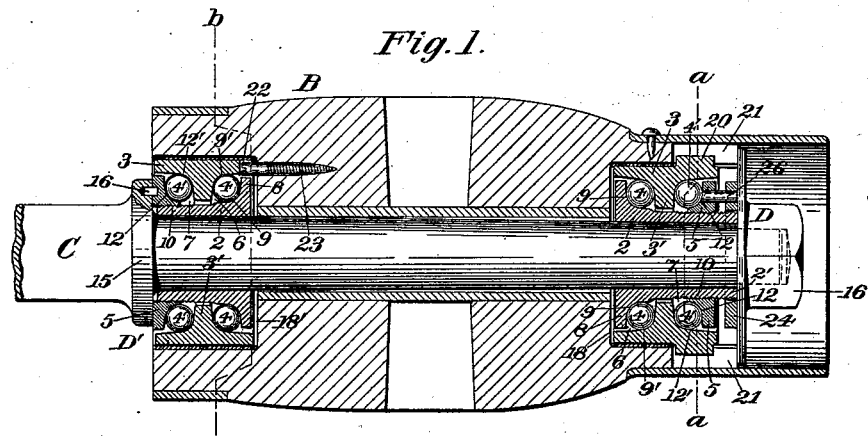
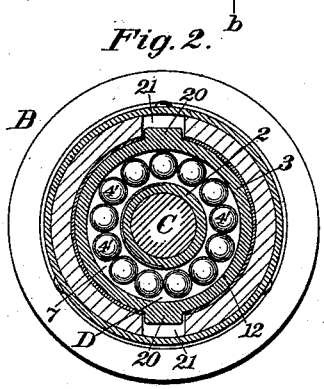
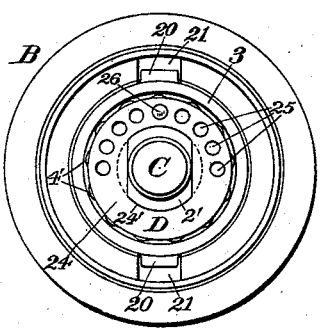
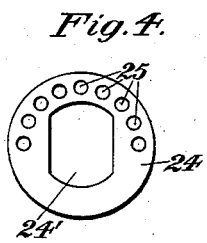
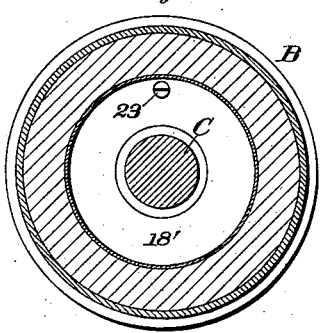
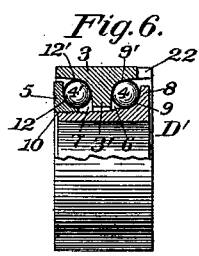
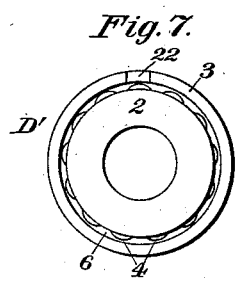
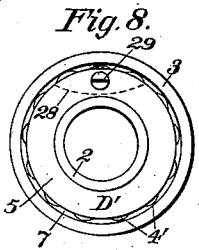
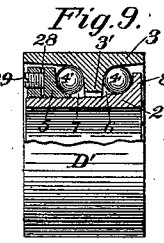
Witnesses:
John L. Edwards Jr.
Fred. J. Dole.
Inventor:
Maurice J. Herbert
By his Attorney,
F. H. Richards

UNITED STATES PATENT OFFICE.

MAURICE J. HERBERT, OF HARTFORD, CONNECTICUT, ASSIGNOR, BY DIRECT AND MESNE ASSIGNMENTS, TO AUSTIN BRAINARD AND CONSTANT L. TUTTLE, OF SAME PLACE.

BALL-BEARING FOR VEHICLE-WHEELS.

SPECIFICATION forming part of Letters Patent No. 537,152, dated April 9, 1895.

Application filed April 11, 1894. Serial No. 507,147. (No model.)

*To all whom it may concern:*

Be it known that I, MAURICE J. HERBERT, a citizen of the United States, residing at Hartford, in the county of Hartford and State of Connecticut, have invented certain new and useful Improvements in Ball-Bearings for Vehicle-Wheels, of which the following is a specification.

This invention relates particularly to vehicle-wheels, and has special reference to roller-bearings therefor. The object of the invention is to furnish, in connection with a vehicle-wheel, a simple, durable and effective ball-bearing in which the parts may be readily assembled without the employment of tools, and which are held in an assembled condition by the interlocking thereof, and which may be adjusted and applied in an operative or assembled condition to a vehicle-wheel, or be removed therefrom without disassembling.

Another object of the invention is to provide, in connection with a vehicle-wheel and its axle, a pair of disconnected independently-operable and independently-adjustable ball-bearings, located one at each end of the hub, and to so construct and organize the same that any end-thrust brought to bear upon the wheel-hub, in either direction, will be carried entirely by one of the duplex bearings without affecting the position or adjustment of the other duplex bearing.

In the drawings accompanying and forming a part of this specification, Figure 1 is a central longitudinal section of a vehicle-wheel hub and its axle with my improvements applied thereto. Fig. 2 is a cross-sectional view of the same taken in line $a$—$a$, Fig. 1, looking toward the left hand in said figure. Fig. 3 is an end view of the same looking toward the left hand in Fig. 1, the axle-nut being removed. Fig. 4 is a side elevation of one form of locking-device for locking the adjusting member of the ball-bearing with relation to the axle. Fig. 5 is a cross-sectional view of the wheel-hub taken in dotted line $b$—$b$, Fig. 1, looking toward the right hand in said figure. Fig. 6 is a sectional side elevation of the duplex journal-bearing shown at the left hand end of the hub in Fig. 1. Fig. 7 is an end view of the same looking toward the left hand in Fig. 6, and Figs. 8 and 9 are end and sectional side elevations, respectively, of a duplex journal-bearing of slightly modified construction.

Similar characters designate like parts in all of the figures.

In the drawings I have shown a hub, designated by B, carried upon an axle, C, and as provided with two remotely-disposed duplex ball-bearings, designated in a general way by D and D', one of which is located at each end of the hub, as illustrated in Fig. 1.

In the preferred form thereof herein shown, each ball-bearing, or roller-box, as it will be sometimes referred to, consists, as a whole, of the two sleeves or thimbles, 2 and 3, respectively, located one within the other; two remotely-disposed sets or circuits of balls, 4 and 4', respectively, supported between said sleeves, as will be hereinafter more fully described, and an adjusting device, 5, connected with one of said sleeves and adapted for adjusting the parts to take up wear. These two members 2 and 3, in connection with the adjusting member 5 constitute a casing or housing for the two sets of balls 4 and 4', said members being constructed and arranged to form two adjacent, but separated ball-receiving chambers, 6 and 7, in which the balls 4 and 4', respectively, are located and held against displacement. The sleeve 2 which will, in practice, be fixed to the axle, is peripherally-flanged at one end, as shown at 8, to form a ball-bearing track, 9, which track constitutes one wall of the ball-receiving chamber 6, and is externally screw-threaded at its opposite end, as shown at 10, to receive the internally screw-threaded adjusting-nut or member, 5. This member 5 is preferably cone-shaped, the flanged or enlarged end thereof forming a ball-bearing track, 12, which track constitutes the opposite side wall of the adjacent ball-receiving chamber 7. The outer hub-engaging sleeve or member 3 is internally flanged, as shown at 3', midway of its length. This flange 3' constitutes the division wall between the two chambers 6 and 7, and forms the two remote and oppositely-disposed ball-bearing tracks 9' and 12' which constitute the inner walls of the said ball-receiving chambers 6 and 7.

In assembling the parts of the ball-bearing or roller-boxes, the sleeve 2 is slid into the sleeve 3 the required distance, after which the balls 4 are placed in the chamber 6 between the tracks 9 and 9' thereof. Then the parts are inverted and the balls 4' are placed in the chamber 7 so as to rest upon the track 12', after which the conical nut or adjusting device 5 is screwed upon the end of the sleeve 2 until the track 12' bears against the set of balls 4'. This will bring all the tracks into a closer relation and secure the requisite adjustment of the parts for practical operation. After the ball-bearings D and D' have both been assembled and adjusted they may then be applied to the hub and axle in the following manner: The ball-bearing D' is first applied to the axle C in the position shown in Fig. 1 of the drawings, preferably by being driven thereon until the outer face of the adjusting-nut 5 is in close bearing-contact with the shoulder 15 of the axle, the shoulder 15 preferably having a projecting pin, 16, to extend into a recess formed in the face of the adjusting-nut 5, as shown in said figure, to hold the adjusting-nut in its adjusted position. This fixedly secures the sleeve 2 and adjusting-device 5 carried thereby to the axle C. The hub B, which is recessed at both ends, as shown at 18 and 18', to receive the journal-bearings D and D', respectively, is then placed upon the axle in the position shown in Fig. 1 of the drawings, means being provided, as hereinafter described, for locking the outer-sleeve 3 of the ball-bearing in engagement with the hub. The ball-bearing D' is next applied to the outer end of the axle in the position shown in Fig. 1, after which the axle-nut 16 is applied to the end of the axle and tightened.

As a means for fixedly-connecting the outer-sleeves or members 3 of the two roller-bearings D and D' to the hub of the wheel, so as to prevent rotation thereof with relation to said hub and still permit a slight endwise movement of the hub without disturbing the position of the said ball-bearings with relation to the axle, I have shown one of the said sleeves 3 provided with a lateral projection, 20, adapted to engage in a transverse recess, 21, formed in the hub, while the sleeve 3 of the other bearing D' is shown as having a notch, 22, formed in one edge thereof which is engaged by the end of a pin or screw, 23, secured in the hub. It is desired to state in this connection, however, that any suitable means for locking the said sleeves 3 with relation to the hub may be employed without departing from my invention.

The adjusting-device 5 of the ball-bearing D is shown as locked in its adjusted position with relation to the sleeve 2 thereof, by means of a collar, 24, secured to the sleeve 2 and having a series of pin-holes, 25, one of which is engaged by a pin, 26, secured to the adjusting device 5. As a substitute for the collar 24 and the pin and pin-holes, the adjusting-device may be slitted transversely midway of its thickness as shown at 28 in dotted lines in Fig. 8, and in full lines in Fig. 9, and be clamped transversely of and upon the thread of the sleeve 2 by a binding-screw, 29. The collar 24 is shown as having an angular central recess, 24', and is non-rotatively fitted to the sleeve 2 by engaging the end 2' thereof which is cut away at its sides to correspond to and fit the angular hole in the collar 24, as will be understood by reference to Figs. 3 and 4.

Any suitable means, it will be understood, may be employed for locking the sleeve 2 of both the ball-bearings to the axle.

By the construction and arrangement hereinbefore described, it will be seen that both ball-bearings run independently of each other and that any disarrangement in adjustment of one ball-bearing will have no effect upon the other. It will also be seen that after the ball-bearings D and D' have been applied to the axle and hub, the tightening or loosening of the axle-nut will not tend in any way to alter the adjustment of one or the other of the ball-bearings. Said ball-bearings being practically disconnected and being independently adjustable, they are in no way dependent upon each other for adjustment.

When the axle-nut 16 is taken off from the end of the axle, the outer ball-bearing D may be drawn off from the axle with the wheel, which, of course, leaves the ball-bearing D' upon the axle. This is the preferred mode of operation, but if, for any reason, it is deemed necessary, both of the ball-bearings may be arranged to be drawn off from the axle with the wheel.

The wheel-hub being of considerable length relative to the length of the ball-bearings, each end of said hub is independently supported by an independent ball-bearing having two sets of balls, each ball-bearing being capable of operation independently of the other. Having thus described my invention, I claim—

1. The combination with an axially-recessed wheel-hub having enlarged recesses in both ends thereof, and with an axle extending through said hub; of two independent roller-boxes located one at each end of said hub and upon said axle, and each comprising an inner annular member fixed to the axle and having an external annular flange at each end thereof one of which flanges is adjustable relatively to the other, an outer annular member fixed to the hub and having an internal annular flange located between the annular flanges of the inner member, and two sets of balls located one at each side of the flange of the outer member and between said flange and the flange of the inner member, the outer members of said roller-boxes being fixedly positioned transversely with respect to the wheel-hub but adapted to have free though slight movements longitudinally of said hub, whereby each end strain or thrust is taken up by but one roller-box and is prevented from being transmitted to the opposite bearing, substantially as described.

2. The combination with an axially-recessed wheel-hub having an enlarged recess in the end thereof, and with an axle extending through said hub; of a roller-box located upon said axle and comprising an inner annular member having a fixed annular flange at one end thereof and having the opposite end thereof externally screw-threaded, an internally screw-threaded annular member adapted to be screwed upon the threaded end of said inner member, an outer annular member having a central internal annular flange located between the annular flange of the inner member and the screw-threaded member which is secured to said inner member, and two sets of balls one set movably contained between the flange of the outer member and the flange of the inner member and the other set movably contained between the flange of the outer member and the screw-threaded annular member secured to the inner member; and a locking device carried by the axle and adapted for engaging said screw-threaded annular member and maintaining said member in its adjusted position against longitudinal movement with respect to the flange of the inner member, substantially as described.

3. The combination with the wheel-hub and its axle, of the ball-bearing member 2 fixed to the axle, the ball-bearing member 3 fixed to the hub concentric to the member 2, two independent sets of balls supported between the two concentric members, an adjusting-nut screwed upon the member 2, and a locking-device non-rotatively securing the adjusting-nut to the member 2 and consisting of a plate or collar non-rotatively engaging said member 2, and a pin removably connecting the plate with the adjusting-nut, substantially as described and for the purpose set forth.

MAURICE J. HERBERT.

Witnesses:
FRED. J. DOLE,
F. H. RICHARDS.